(12) United States Patent
Faulkner et al.

(10) Patent No.: US 6,315,348 B1
(45) Date of Patent: Nov. 13, 2001

(54) VISOR SHADE

(76) Inventors: Willie Faulkner; Rhonda Faulkner, both of 116 Frey Ct., Michigan City, IN (US) 46360

( * ) Notice: Subject to any disclaimer, the term of this patent is extended or adjusted under 35 U.S.C. 154(b) by 0 days.

(21) Appl. No.: 09/635,681

(22) Filed: Aug. 10, 2000

Related U.S. Application Data

(60) Provisional application No. 60/149,477, filed on Aug. 19, 1999.

(51) Int. Cl.$^7$ ......................................................... B60J 3/02
(52) U.S. Cl. ............................................................... 296/97.6
(58) Field of Search ............................... 296/97.6, 97.8, 296/97.1

(56) References Cited

U.S. PATENT DOCUMENTS

| | | | |
|---|---|---|---|
| 2,261,881 | * 11/1941 | Horstmann | 296/97.6 |
| 3,105,718 | * 10/1963 | Ralls | 296/97.6 |
| 3,304,118 | 2/1967 | Jonas . | |
| 3,837,703 | 9/1974 | Holladay . | |
| 4,053,180 | * 10/1977 | White . | |
| 4,982,992 | 1/1991 | Vu et al. | 296/97.6 |
| 5,356,192 | 10/1994 | Schierau | 296/97.6 |
| 5,613,724 | 3/1997 | Alula | 296/97.6 |
| 5,613,725 | 3/1997 | Lozano | 296/97.6 |
| 5,673,957 | 10/1997 | Moo et al. | 296/97.6 |

FOREIGN PATENT DOCUMENTS

| | | | |
|---|---|---|---|
| 2310894 | 5/1975 | (FR) . | |
| 2153313 | 8/1985 | (GB) . | |
| 494645 | * 11/1955 | (IT) | 296/97.6 |
| 510386 | * 5/1957 | (IT) | 296/97.6 |

* cited by examiner

Primary Examiner—Joseph D. Pape
(74) Attorney, Agent, or Firm—Richard C. Litman

(57) ABSTRACT

A visor shade attached to the existing sun visor provided by a given vehicle. The visor shade would be attached to the back of an existing sun visor and be pivotally rotated by the driver of the vehicle into any desired positions between the folded-up existing sun visor and the windshield of the vehicle. The visor shade utilizes a three-sided hinge and set screw that attaches the rectangular transparent visor body of the visor shade to the existing sun visor. The visor shade is manually adjusted into place without the use of clumsy clamps, clips or hinges. The visor shade is made of lightweight, rigid colored thermoplastic material that comes in a variety of colors and sizes to accommodate a wide range of vehicles.

5 Claims, 4 Drawing Sheets

VISOR SHADE

CROSS-REFERENCE TO RELATED APPLICATION

This application claims the benefit of U.S. Provisional Patent Application Ser. No. 60/149,477, filed Aug. 19, 1999.

FIELD OF THE INVENTION

The present invention relates to a visor shade that attaches to an otherwise conventional vehicle sun visor.

DESCRIPTION OF RELATED ART

Sun visors can be an important part of safely driving a vehicle, particularly during daytime driving in bright sunlight. Almost all vehicles are provided with adjustable sun visors extending from the interior roofing of the vehicle, usually on both the driver and passenger sides. However, the sun visors provided often do not block all of the sunlight coming through a vehicle's windshield and into the eyes and face of a driver.

Sun visors can be bought to improve the safety of driving a vehicle. Most sun visors are attached to the bottom edge of the sun visors provided by a vehicle to effectively shield a driver from potentially impairing sunlight. Sun visors are well-known in the related art. The related art describes a number of sun visors, most of which utilize clumsy clamps and clips that attach an sun visor to and extending down from the sun visor provided with the vehicle.

Patents issued to Jonas (U.S. Pat. No. 3,304,118), Holladay (U.S. Pat. No. 3,837,703), Vu et al. (U.S. Pat. No. 4,982,992), Lozano (U.S. Pat. No. 5,613,725) and Moo et al. (U.S. Pat. No. 5,673,957) all illustrate the use of cumbersome clips, clamps and hinges with a sun visor. These devices may be difficult to put into position, particularly while operating a vehicle. Many times the mounting clips, clamps and hinges can also tear or puncture the existing sun visor when attaching the sun visor.

These are just some of the problems encountered with the use of current sun visors. What is needed is a sun visor that does not utilize bulky clips, clamps or hinges, is easy to use and install, and can be safely deployed while operating a vehicle. Perhaps a better design is the key needed to spur these needed changes None of the above inventions and patents, taken either singly or in combination, is seen to describe the instant invention as claimed.

SUMMARY OF THE INVENTION

The visor shade of the instant invention is attached to the back of an existing sun visor, and pivotally rotated by the driver of the vehicle into any desired position between the folded-up existing sun visor and the windshield of the vehicle. The visor shade utilizes a three-sided hinge and set screw that attaches the rectangular transparent visor body of the visor shade to the existing sun visor. The visor shade is manually adjusted into place without the use of clumsy clamps, clips or hinges. The visor shade is made of lightweight, rigid colored thermoplastic material that comes in a variety of colors and sizes to accommodate a wide range of vehicles.

Accordingly, it is a principal object of the invention to provide a visor shade which is attached to the existing sun visor provided by a vehicle.

It is another object of the invention to provide an improved visor shade that can be easily attached to an existing sun visor of a vehicle.

It is a further object of the invention to provide a visor shade that can be easily positioned in place by a driver while safely operating a vehicle.

Still another object of the invention is to provide a visor shade that does not puncture or tear an existing sun visor while attached to the existing sun visor.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
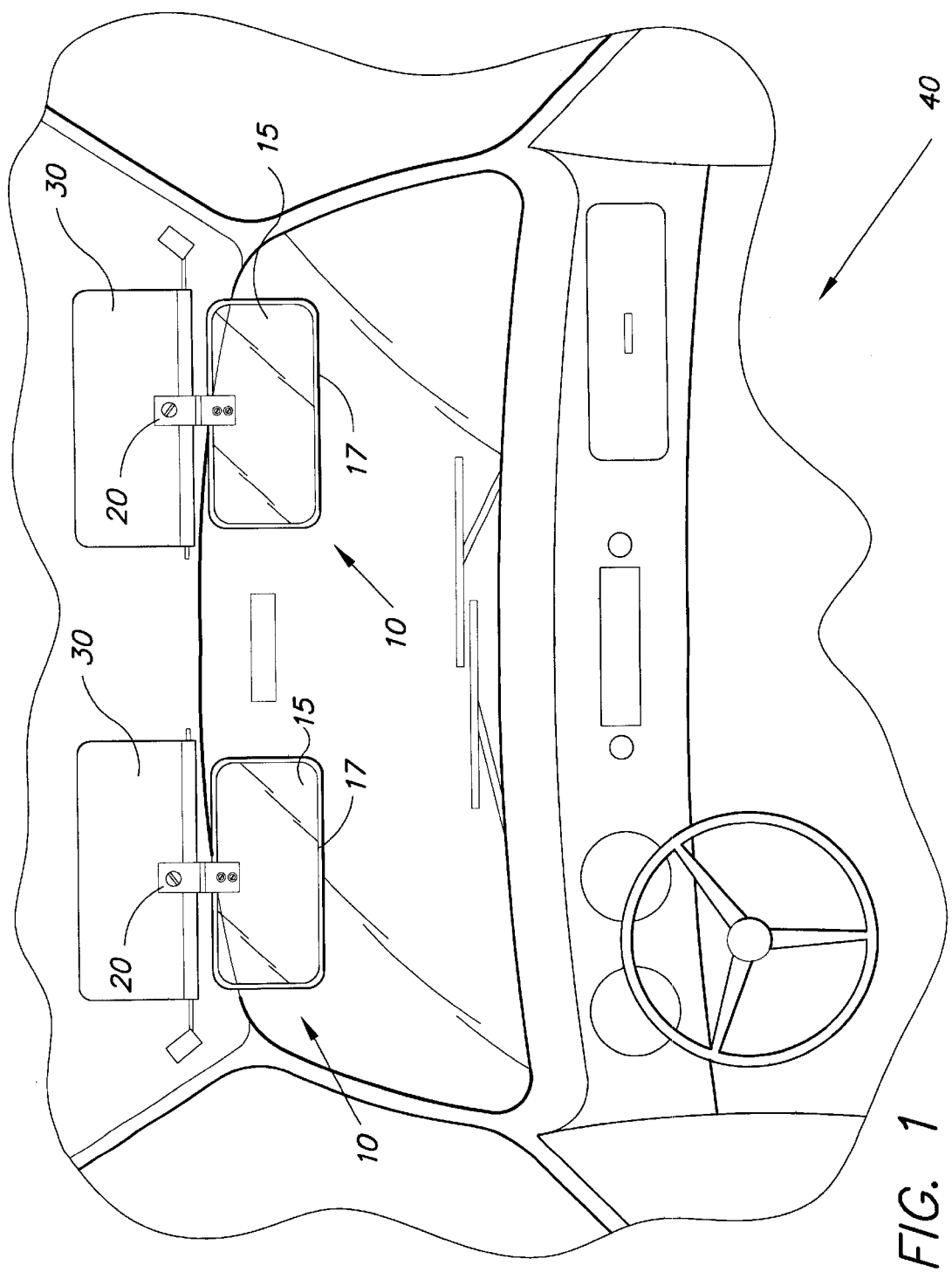
FIG. 1 is an environmental, perspective view of a visor shade according to the present invention.

The present invention is a visor shade 10. As generally shown in FIG. 1, the visor shade 10 comprises an attaching means and a rectangular transparent visor body 15. The attaching means attaches the rectangular transparent visor body 15 from the back side of an existing sun visor 30 of a motor vehicle 40.

Figure 2:
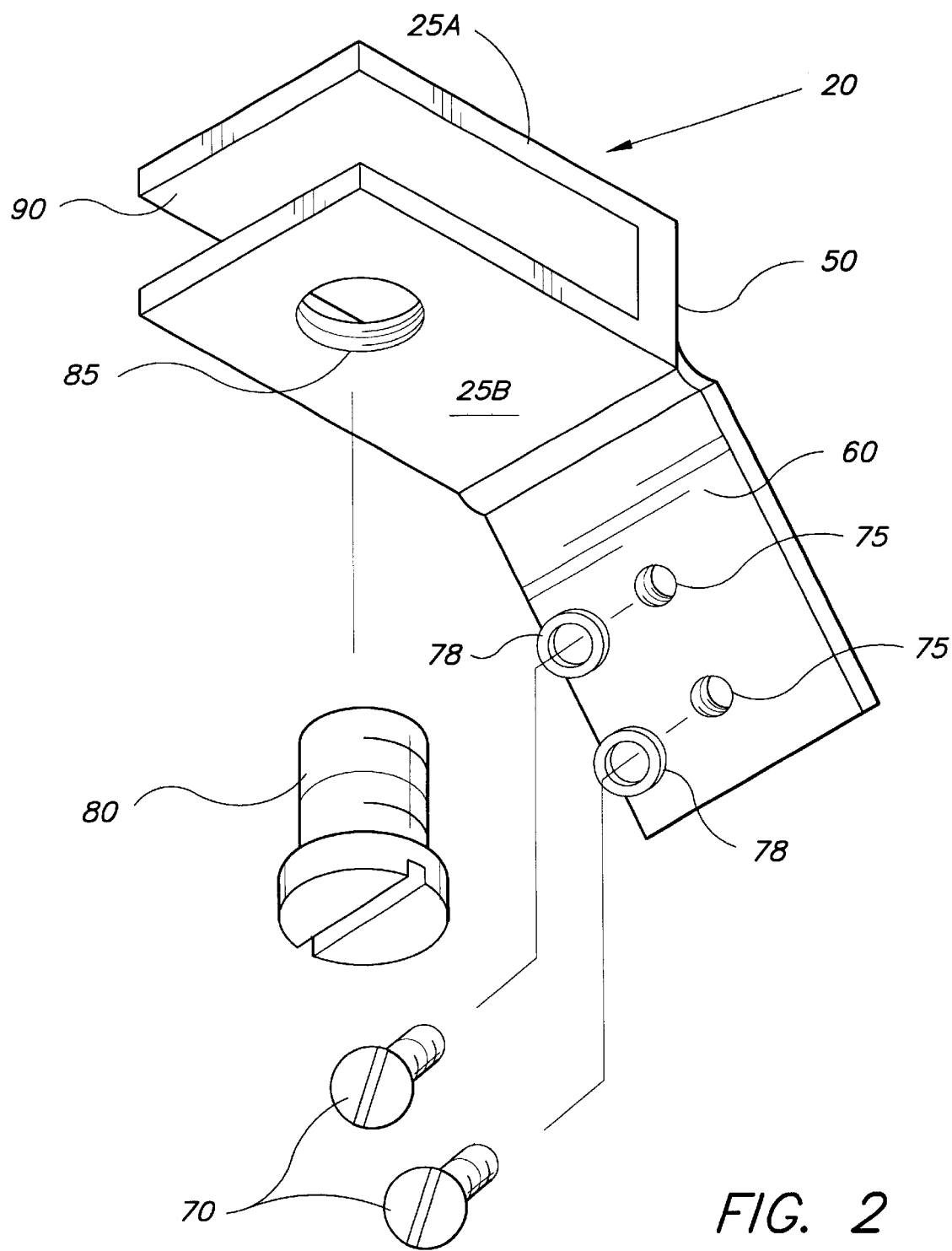
FIG. 2 is an enlarged scale, exploded view of the hinge of the visor shade.

As specifically shown in FIG. 2, the attaching means is a hinge 20 including a first planar arm 25A and a second planar arm 25B connected by side 50. The first arm 25A is parallel to the second arm 25B to define a generally U-shaped gap 90. The second arm defines a threaded aperture 85 for receiving set screw 80. The back edge of the existing sun visor 30 is slid into the gap 90 of the hinge 20. The existing sun visor 30 is further secured with a set screw 80, which is temporarily tightened to hold the existing sun visor 30. The set screw 80 holds the existing sun visor 30 in place, without puncturing or tearing. The set screw 80 can be easily released by unscrewing the set screw 80 and pulling out the back edge of the existing sun visor 30 from the gap 90. The set screw 80 itself requires only a standard screwdriver for tightening or loosening.

Two smaller mounting screws 70 permanently secure the rectangular transparent visor body 15 centrally to the remaining third planar arm 60 of the hinge 20. There is also an aperture 75 and a thermoplastic washer 78 provided for each mounting screw 70 to prevent scratches and cracks in the transparent body 15. These mounting screws 70 require only a standard screwdriver for tightening or loosening.

Figure 3A:
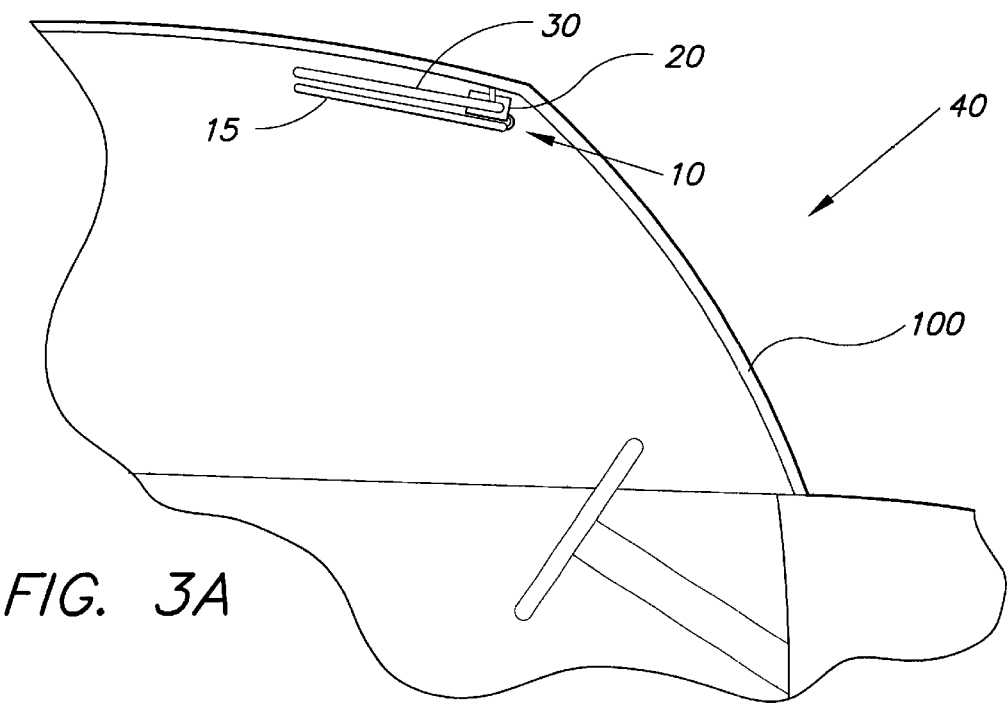
FIGS. 3A, 3B, 3C and 3D are side elevational, largely diagrammatic views of a visor shade showing various stages of deployment of the visor shade.

The third arm 60 is pivotally connected to side 50 to form a living hinge as shown, or a piano hinge, or other hinge that will allow the visor to remain in a set position once moved, as is depicted in FIGS. 3A to 3D. When moving the rectangular transparent visor body 15, the existing sun visor 30 should be placed up in a closed position parallel to the roof of the vehicle 40. The rectangular transparent visor body 15 can be rotated and folded back flat below the existing sun visor 30. This is depicted in FIG. 3A. This is done manually by the user, who can rotate the rectangular transparent visor body 15 into a desired position. This also describes the adjusting means of the visor shade 10.

Figure 3B:
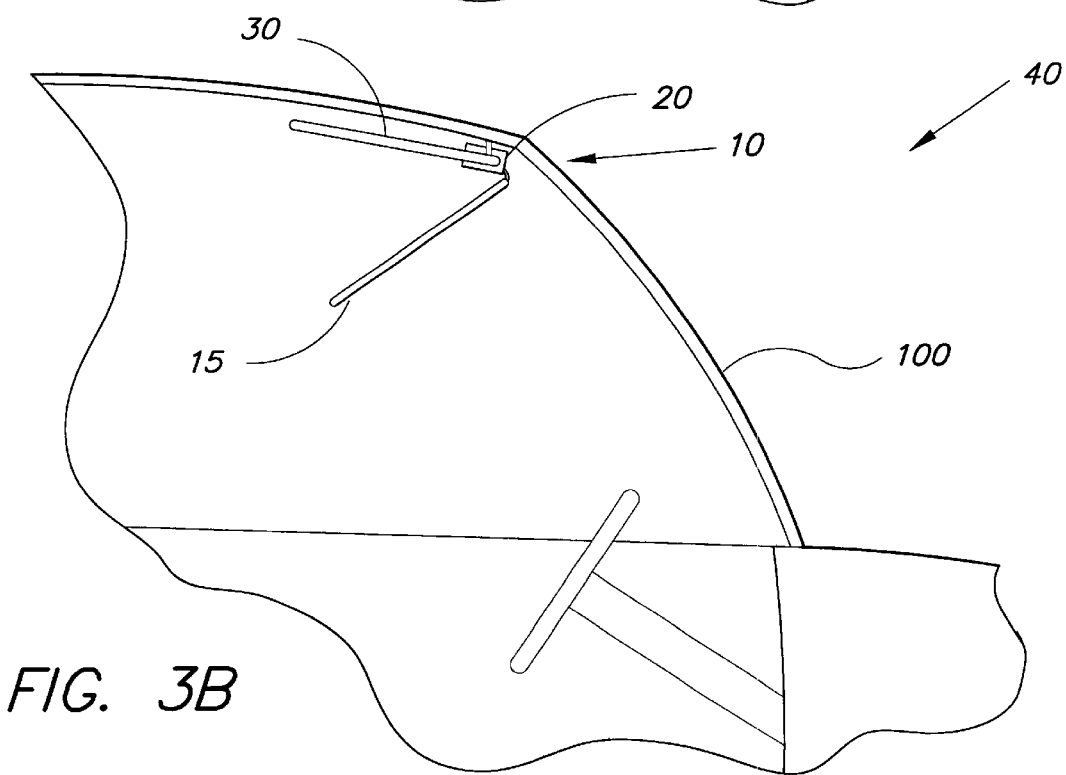
Figure 3C:
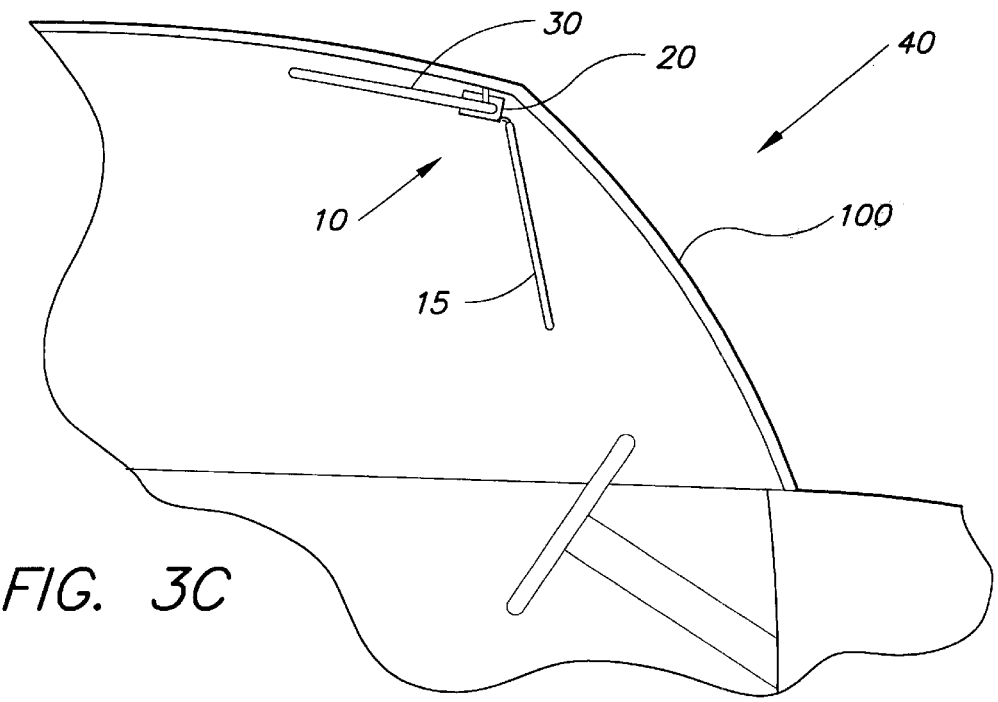
Figure 3D:
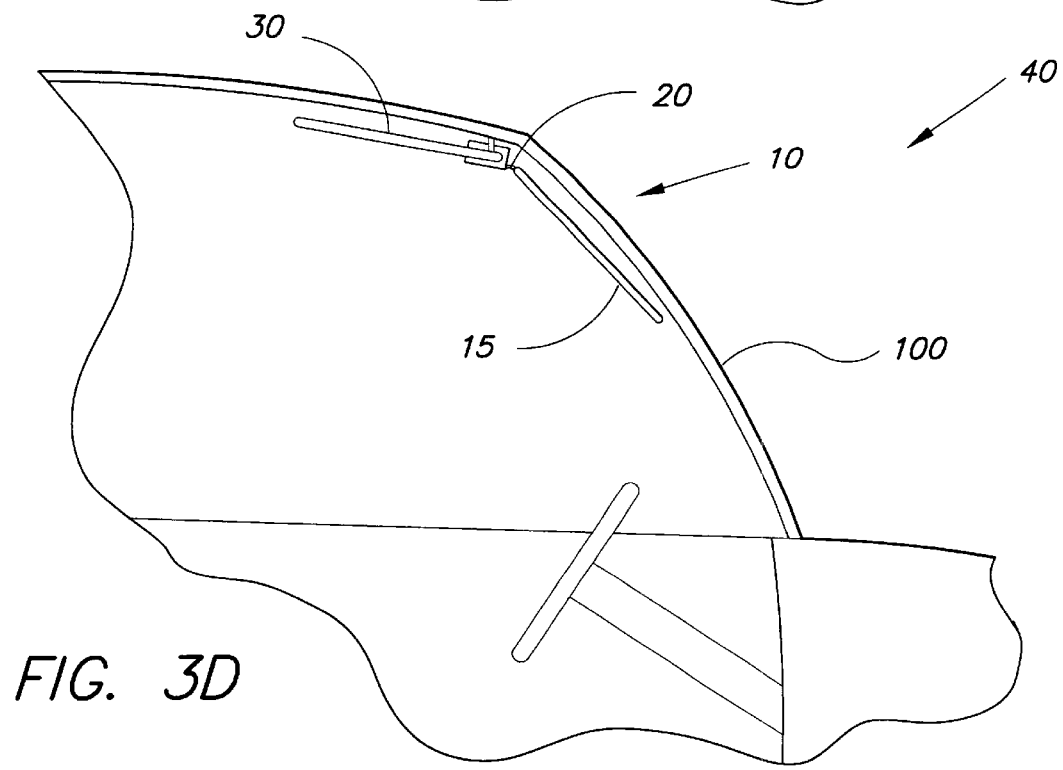

The desired positions are simply those positions which block the sunlight shining through the windshield 100 and into the eyes of the driver. The visor shade 10 is rigid and pivotally can remain in place once rotated into a desired position. However, the visor shade 10 is still flexible enough to be manually rotated into additional positions as desired (between the existing sun visor 30 and the windshield 100 of the vehicle 40). Some of these various positions are depicted in FIGS. 3B, 3C and 3D.

The rectangular transparent visor body 15 comprises a flat rectangular lens portion peripherally surrounded by a thickened vinyl edge 17 (See FIG. 1). The rectangular transparent visor body 15 itself is made of rigid thermoplastic that comes standard in seven popular colors The visor shade 10 comes in sizes to fit small, medium sized and large vehicles and also comes in sizes for vans and pick-up trucks. Custom sizes are provided for commercial vehicles and buses as well. The actual dimensions of the visor shade 10 for a medium sized vehicle 40 is approximately 8"×15" and is ⅛th of an inch thick.

It is to be understood that the present invention is not limited to the embodiments described above, but encompasses any and all embodiments within the scope of the following claims.

We claim:

1. A visor shade for attachment to a vehicle sun visor, said visor shade comprising:

a substantially rectangular transparent body having a peripheral edge including a top elongated edge;

a hinge member including a first planar arm and a second planar arm connected by a side, said first arm being parallel to the second arm to define a generally U-shaped gap, said second arm having a threaded aperture with a set screw for securing said hinge member to the vehicle sun visor;

a third planar arm pivotally connected along the side of said hinge member, said third arm having means for securement to said transparent body centrally along the top edge;

whereby the transparent body can be manually rotated from a stored position, wherein the transparent body is adjacent the vehicle sun visor, to any set position between the stored position and a windshield of a vehicle.

2. The visor shade according to claim 1, wherein said third arm is pivotally connected to the side of the member by a living hinge.

3. The visor shade according to claim 1, wherein said transparent body is made of lightweight, rigid and colored thermoplastic material.

4. The visor shade according to claim 1, wherein said securement means include at least one aperture with a respective mounting screw for permanently securing said transparent body to said third arm.

5. The visor shade according to claim 1, wherein the peripheral edge of said transparent body includes a thickened vinyl edge.

* * * * *